Feb. 22, 1949.  H. FRIEDMAN  2,462,088
METHOD OF MEASURING THICKNESS OF CURVED
SECTIONS AND APPARATUS THEREFOR
Filed Oct. 24, 1944  4 Sheets-Sheet 1
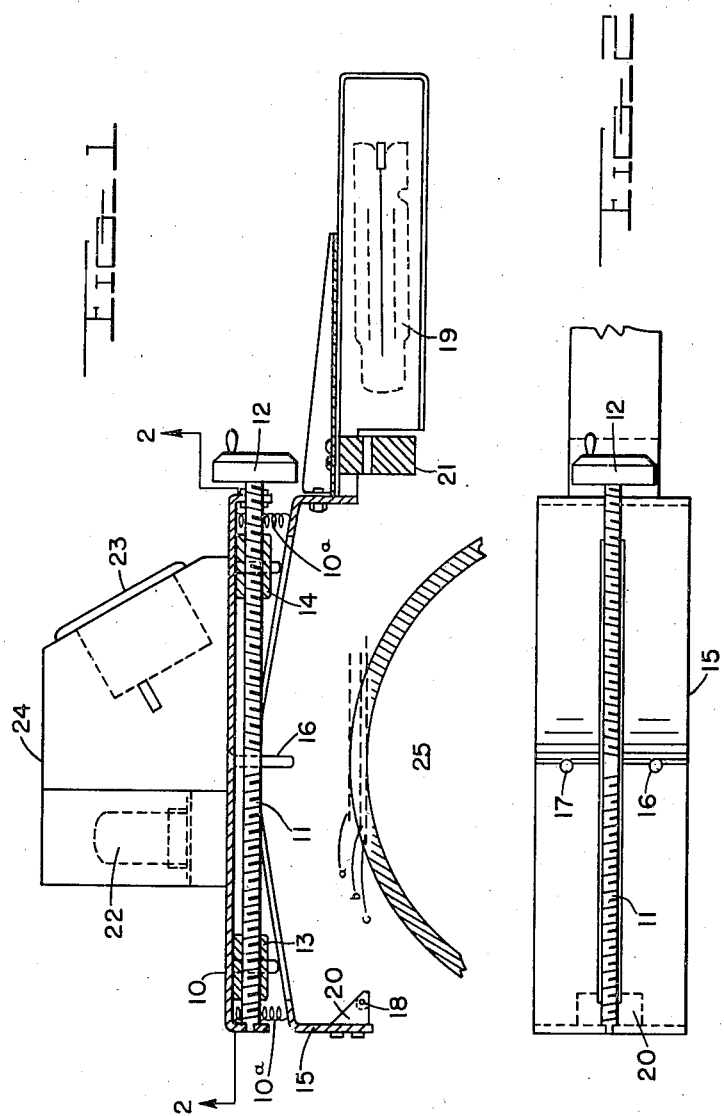
Inventor
HERBERT FRIEDMAN
By [signature]
Attorney

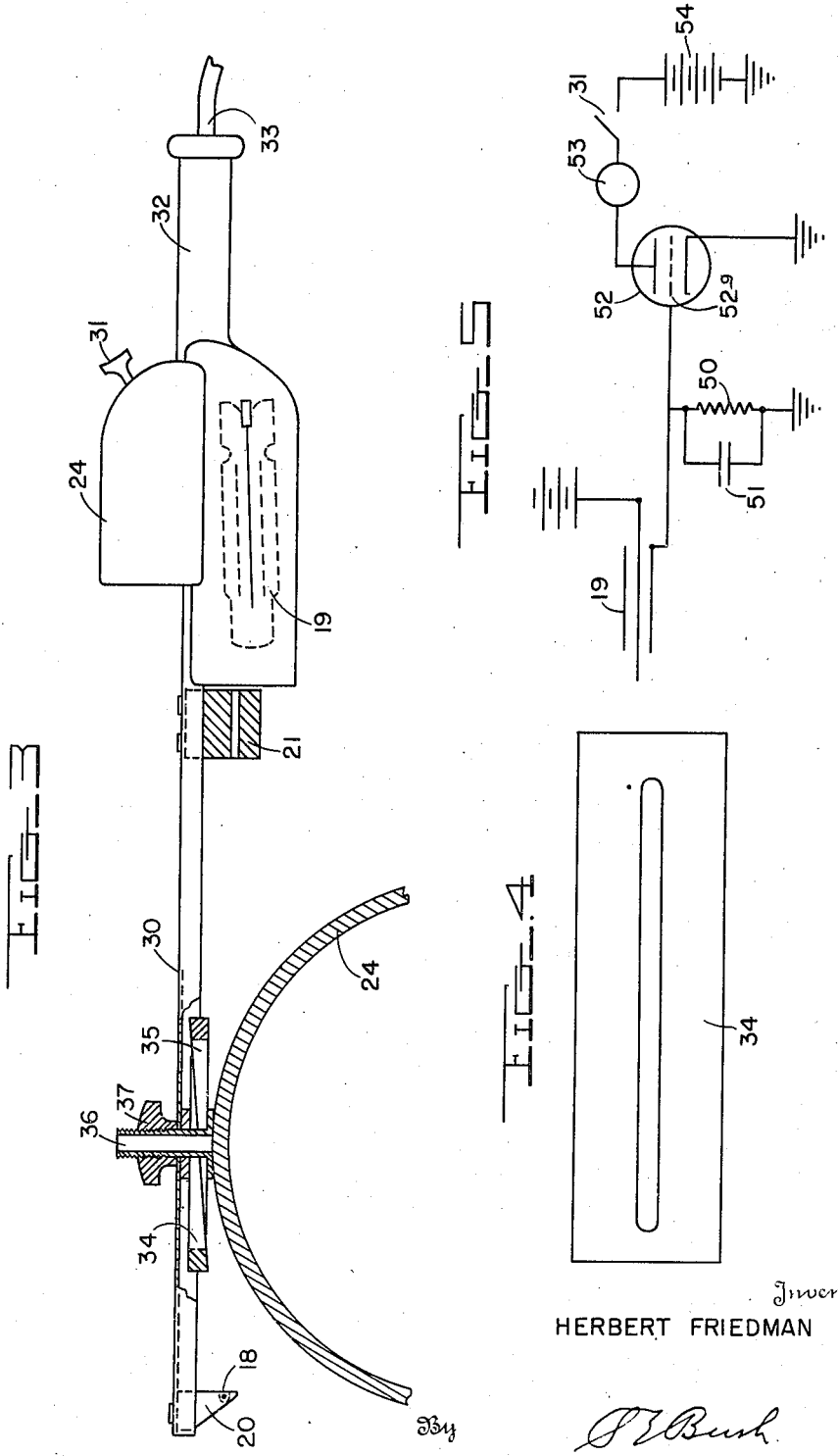

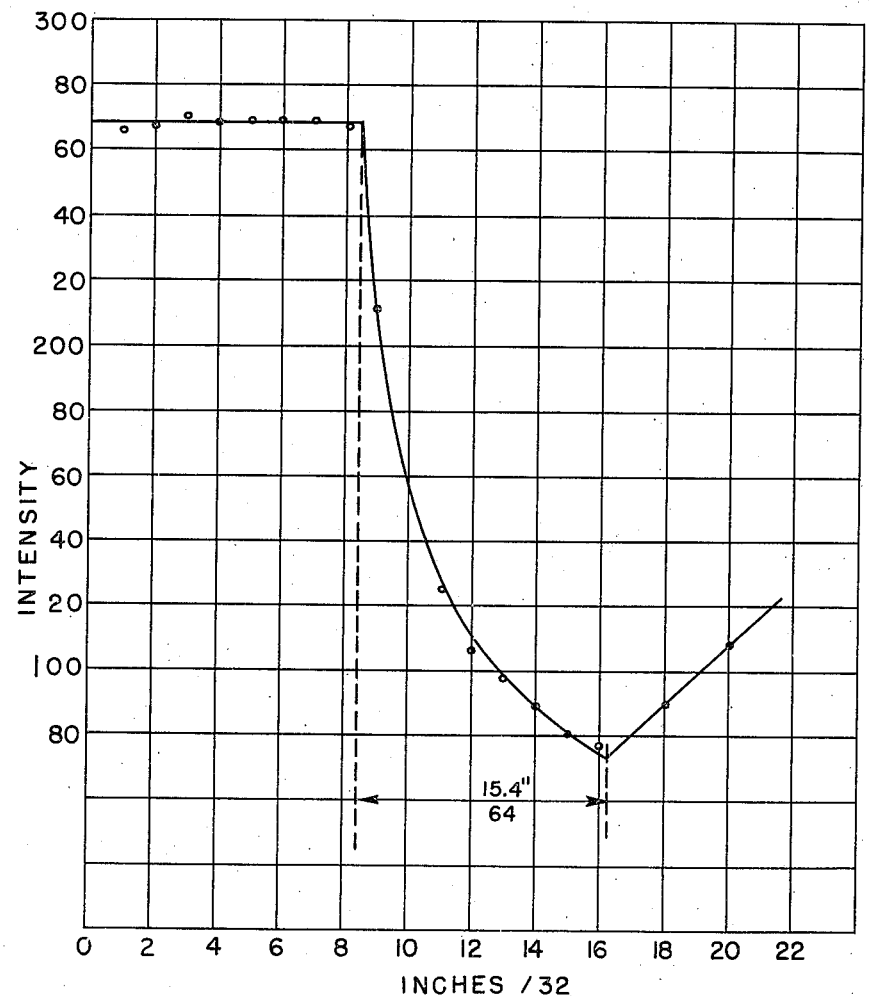

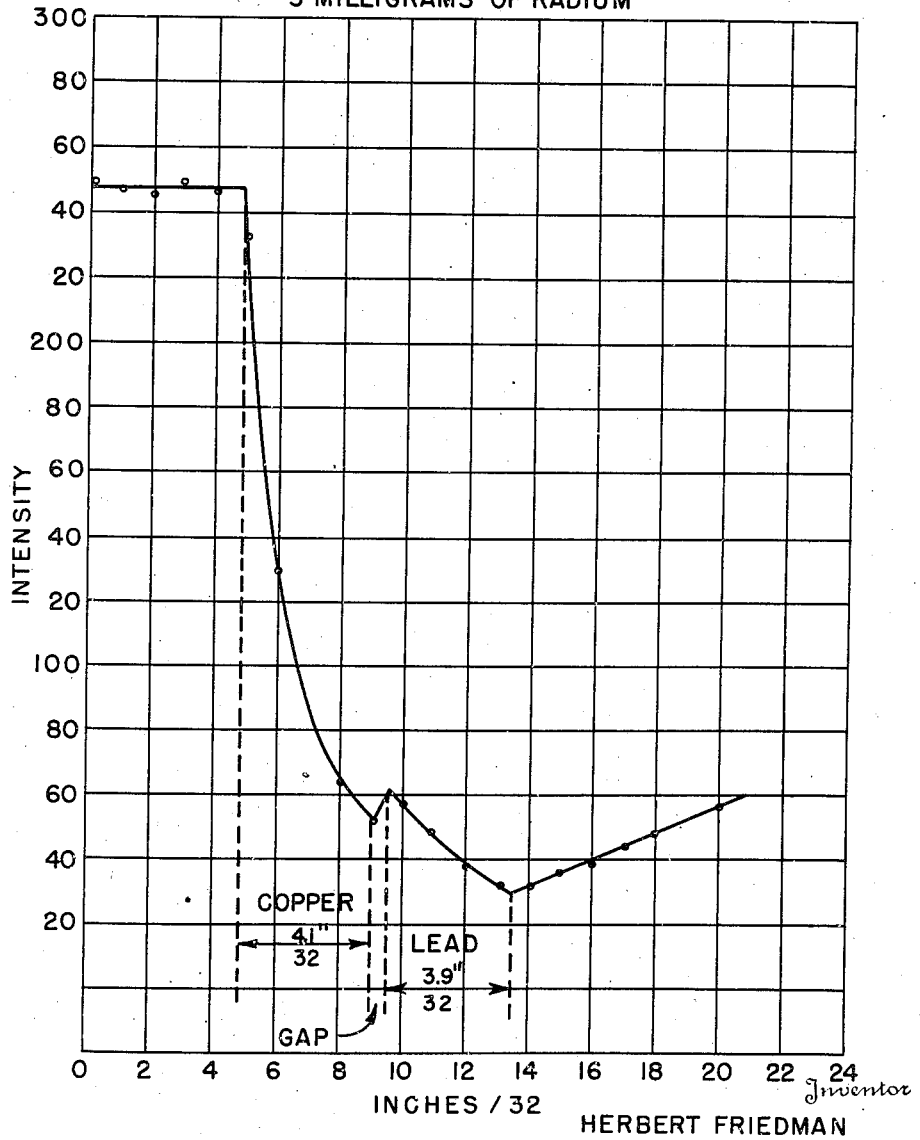

Patented Feb. 22, 1949

2,462,088

UNITED STATES PATENT OFFICE 2,462,088

METHOD OF MEASURING THICKNESS OF CURVED SECTIONS AND APPARATUS THEREFOR

Herbert Friedman, Arlington, Va.

Application October 24, 1944, Serial No. 560,090

9 Claims. (Cl. 250—83)

(Granted under the act of March 3, 1883, as amended April 30, 1928; 370 O. G. 757)

My invention relates to a method and apparatus for measuring the thickness of curved sections generally, pipe and tube wall thicknesses specifically and, particularly, to a non-destructive method involving only a simple geometrical measurement.

It is often very desirable to be able to measure the thickness of a pipe wall along its entire length in order to judge the uniformity of the wall thickness. The difficulty involved in making such measurements mechanically on long sections of small diameter pipe is too apparent to need elaboration. When it is desired to check the uniformity of lined pipe or to judge the extent of fouling of pipe lines the difficulties of mechanical measurements are multiplied many fold.

Recently there have been proposed several methods of measuring thicknesses of heavy steel sections and pipe walls which methods are all based on measurements of the intensity of transmitted radiation and on the intensity of scattered radiation compared with incident radiation as disclosed, for example, in United States Patent 2,277,756 of March 31, 1942, to D. G. C. Hare, United States Patent 2,264,725 of December 2, 1941 to W. E. Shoupp and L. M. Tichvinsky, United States Patent 2,346,486 of April 11, 1944 to D. G. C. Hare and United States Patent 2,349,429 of May 23, 1944 to G. Herzog and J. H. Stein. Apparatus of these types have generally included a source of penetrating radiation, such as X-rays or a radioactive material, a detector, such as an ionization chamber or Geiger-Muller tube, and a measuring circuit. Measurements are based on the exponential absorption law $I_x/I_0 = e^{-\mu \rho x}$ in which $I_0$ is the incident intensity, $I_x$ is transmitted intensity, $\mu$ the mass absorption coefficient, $\rho$ the density of the irradiated material and $x$ the length of the radiation path through the material. While measurements based on the measurement of the absolute transmitted radiation intensity as compared with the incident radiation intensity are satisfactory, they involve several inherent disadvantages, namely, the nonlinearity of the relationship between the transmitted intensity and the incident intensity, inaccuracies in meter and instrument calibrations used in determining the absolute intensities and the inconvenience of using calibration data depending upon the composition of the material studied.

A satisfactory method of measurement based on scattering of back radiation is well described by Donald G. C. Hare in United States Patent 2,277,756 of March 31, 1942, which measurement also follows a complex law, namely $$I_D = \frac{kk^1 c^4}{2r_2 m^2 c^4}(1 - \cos^2 \theta) X_0$$

in which $I_D$ is the intensity of incident radiation, $k$ the cross section of the incident beam, $k^1$ a constant dependent on the electron density of the material irradiated, $c$ the charge of an electron, $r$ the distance from the scattering electron to the point of observation, $m$ the mass of the electron, $c$ the velocity of light, $\theta$ the angle between the incident and the scattered ray and $X_0$ the thickness of the material irradiated. In the United States Patent 2,349,429, Herzog and Stein disclose a method of measuring pipe wall thicknesses based on the irradiation of a segment of the pipe wall and measurement of the intensity of the transmitted radiation intensity. This method, like its predecessors, gives satisfactory results but is dependent upon a very complex relationship involving the exponential absorption law and the relationship between the inner and outer pipe wall diameter and the length of the path of radiation through the pipe wall segment.

It is the principal object of my invention to provide a method of measuring thicknesses of curved elements, which need not necessarily be uniformly curved, using a radiation source and detector in a manner which eliminates all direct dependence of the thickness measurement on the absolute intensity of the radiation transmitted and to base the measurement on a simple, direct, geometric determination of the thickness.

It is the second object of my invention to provide an arrangement of apparatus whereby a simple and direct measurement of pipe and tube wall thicknesses can be made from one side of the pipe using a radiation source, a detector and calipers.

It is a third object of my invention to provide a rapid non-destructive method of inspecting pipe and tubing for uniformity of wall thickness.

My invention accordingly comprises the several steps and the relation of one or more of such steps to each of the others, and the apparatus embodying the combinations of elements and arrangements of parts which are adapted to effect such steps, all as exemplified in the following detailed disclosure and the scope of the invention will be indicated in the claims.

The method and means for practicing my invention will be more clearly understood by reference to the accompanying drawings in which, Figure 1 is a diagram of one form of apparatus, partially in section showing the arrangement of parts and their interrelationship;

Figure 2 is a detailed drawing of a part of the apparatus shown in Figure 1, and is a view taken along the line 2—2;

Figure 3 is a diagram of an apparatus used for inspecting pipe wall thicknesses;

Figure 4 is a detailed drawing of a part of the apparatus shown in Figure 3;

Figure 5 is a diagram of a simple intensity measuring circuit satisfactory for use with the apparatus;

Figure 6 is a reproduction of data taken in measuring the wall thickness of four-inch steel pipe;

Figure 7 is a reproduction of the data taken in measuring the thickness of the wall of a lead-lined copper tube.

Briefly, my invention comprises a method and apparatus for detecting the spatial relationship between the outside and inside walls of a pipe and a fixed point by means of a fine pencil of radiation and detector serving as indicators.

Referring to Figures 1 and 2 where a preferred form of apparatus for practicing my invention is illustrated, 10 represents a support on which various components of the measuring apparatus are mounted. This support 10 is usually a structure mounted over a work table at a height sufficient to permit sliding a pipe under it on the same table. The table thus supports the support 10 and the pipe in fixed relation, to maintain which relation no clamps or chocks are necessary because of the fact that movement of the beam through the pipe exerts no mechanical force thereon. A right and left-hand threaded arm 11 having a driving handle 12 is held at its ends by support 10. Arm 11 carries threaded members 13 and 14 which bear on angular member 15, suspended from 10 by tension members 10a.

Member 15 shown in detail in Figure 2, is guided in vertical motion relative to support 10 by lugs 16 and 17 and at its respective ends carries a radiation source 18 and detector 19. Member 15, as shown in Figures 1 and 2, is a single piece bent to form the arms of an isosceles triangle. It is slotted to permit its free movement in a vertical direction relative to arm 11, and is bent at an angle which will be sufficient to span the largest pipe section it is expected to measure.

Since it is desired to produce and detect a fine pencil or narrow beam of radiation, source 18 is placed in a relatively deep hole in a lead block 20 to obtain a fine pencil of radiation. I have found that a source comprising a few milligrams of radium enclosed in a cylindrical platinum shell one centimeter long and one millimeter in diameter gives a satisfactory beam. To obviate difficulty which would be created by the normal divergence of the beam in passing from the source to the detector a collimating block 21 having a hole aligned with source 18 is placed before detector 19. In the figure the relative size of the hole is exaggerated in order to simplify the mechanics of the showing. Thus, it will be seen that the ends of member 15 are spanned by a very fine pencil of radiation, or, rather, detector 19 is activated only by a very fine pencil of radiation, which as shown in Fig. 1 is horizontal and at right angles to the vertical radius of the pipe.

A detail in the construction of the apparatus is shown in the arrangement of the detector. It is desirable to tilt detector 19 at a slight angle in order that a substantial part of the length of the cathode of the detector, which preferably is a Geiger-Muller counter, will be irradiated by the narrow beam of radiation coming through the collimating hole in block 21.

Detector 19 is electrically connected to a counting circuit having its components tube .22 and meter .23 mounted in housing 24. A common form of counting circuit used in Geiger-Muller tube circuits is shown in Figure 5.

The operation of the apparatus is relatively simple. It is well known that the rapidity with which a Geiger-Muller tube will discharge depends upon the number of quanta of radiation impinging upon it. As indicated in the drawing, a fine pencil of radiation is directed at the detector 19. Interposition of any solid material between source 18 and detector 19 results in the absorption of some radiation in the material and a corresponding decrease in the intensity of radiation reaching the detector and associated measuring circuit. It is evident from the figure that a pipe 25 interposed between source 18 and detector 19 and moved vertically will interpose a solid metal path progressively increasing in length between source 18 and detector 19 as indicated by paths a, b, and c indicated by dotted lines in the drawing. A vertical movement of the pipe upward beyond path a increases the effective solid path traversed by the radiation beam. A vertical movement of the pipe slightly beyond path c results in the sudden shortening of the effective metal path. The response of the apparatus to vertical movement of the pipe is a sudden decrease in received radiation intensity at the detector when path a is passed and a sudden increase in received radiation intensity when path c is passed.

Inasmuch as it is usually inconvenient to move a heavy pipe section, the apparatus itself can be made to change the relative spatial positions of the radiation path and the pipe wall. By turning handle 12, thus rotating arm 11, riders 13 and 14 can be drawn together or pulled apart. Since riders 13 and 14 bear on member 15 which carries the radiation source and detector on its ends and member 15 is constrained to move vertically as above described, turning of handle 12 has the effect of moving the radiation beam vertically toward the center or away from the center of the pipe while the latter rests upon the table upon which the support 10 is mounted thus maintaining the mutually orthogonal relationship between the beam and the vertical radius of the pipe as shown in Fig. 1. The effect on the intensity of the radiation received by the detector is exactly the same as that produced by moving the pipe.

Thus it is clear that my method of measuring pipe wall thickness or the thickness of any curved section, uniform or non-uniform, depends upon detecting the outer and inner walls of the section observed. The intensity measuring circuit is not used as a primary scale but is used merely to indicate the presence of surface boundaries of the specimen measured. Thus, sections of any material can be measured with no calibration data relating material, radiation, intensity, and density to the thickness of the section.

Since the arm 11 can be calibrated accurately in terms of inches per revolution, the number of revolutions of the arm required to move the line of the radiation beam radially through the pipe wall can be measured. Detection of two sudden changes in the intensity of the radiation, one a decrease and the second an increase, indicates the outer and inner boundaries of the pipe wall respectively. Since it is the outer and inner walls which are detected, it is not necessary that the beam go through the wall in a direction perpendicular to the pipe or tube axis.

A good method of determining thicknesses of curved sections is to plot relative intensity of received radiation versus the distance the radiation beam is moved as was done in Figures 6 and 7. In Figure 6, the thickness of the wall of 4-inch steel pipe was measured according to this method. The measured wall thickness according to this method was 15.4/64 as compared with a thickness of 15/64" determined by means of standard calipers. In Figure 7, results are given as obtained with a lead-lined copper tube on which a measurement was made.

The gap between the unbonded lead and copper was detected clearly in the measurement. Plotting of relative intensity of received radiation against movement of the beam permits close determination of the wall thickness as the data of Figures 6 and 7 show. In both cases it is apparent that the precision of the determination could have been improved by determination of a larger number of points near the critical points of the curves.

In Figure 3 there is shown a design of a hand device for performing routine inspections of pipe walls to determine whether or not they are thick enough to satisfy requirements. In the drawing, 30 represents a rod-like support on which the other parts of the apparatus are carried. At one end of the support there are mounted the radiation source 18 and holder 20 and at the other the detector 19, block 21, measuring circuit housing 24, push-button (thumb operated) switch 31, and handle 32 through which power cable 33 enters.

As was explained in connection with Figure 1, the effective amount of solid interposed in the path of radiation will determine the intensity of that reaching the detector. In this apparatus, as explained in conjunction with Figure 1, care is taken to provide for the detection of a narrow pencil radiation by providing collimating block 21 and tilting detector 18.

Since the object in using this apparatus is to determine whether a pipe wall thickness exceeds a given minimum, no provision is made for moving the beam radially past the wall. Wedges 34 and 35 together with bolt 36 and lock nut 37 take the place of the micrometric movement of the beam shown in Figure 1.

In Figure 4 there is shown a detailed view of a wedge 34. As seen it has a longitudinal slot to permit adjustment by means of nut and bolt 36 and 37 of the separation between the head of bolt 36 and the line of radiation.

In operation, wedges 34 and 35 are set by means of flat headed bolt 36 and nut 37 so that the path of the radiation through the metal pipe wall will just equal the maximum path obtainable for the minimum acceptable pipe wall thickness. To inspect a pipe, all that is required is to hold the apparatus in the position shown, press activating switch 31, and wait a few seconds to get an equilibrium reading on the indicating meter. If the reading is too high, it will indicate too thin a section. If the reading is substantially lower than expected for satisfactory pipe it will indicate the presence of a thick spot in the pipe. The entire pipe can be inspected for uniformity by sliding the instrument, slowly, longitudinally along the pipe. Meter fluctuations will indicate the locations of non-uniformities in the pipe section. By rotating the pipe, while holding the instrument in place, the cross sections can be inspected also.

In Figure 5 there is shown a common form of intensity measuring circuit used with Geiger-Muller tubes. It is not the only type that can be used, but is simple, sensitive and not subject to erratic deviations from normal behavior. In the figure 19 represents the detector or Geiger-Muller tube, which has its anode connected to a high voltage source, which will be approximately 1000 volts. The cathode is grounded through resistance capacitance circuit 50, 51. Tube 52 has its control grid 52g connected to the cathode of the Geiger-Muller tube. In the plate circuit of the tube, 31 represents the switch of Figure 3, 53 represents a meter and 54 the power supply.

In operation, the charge on capacitor 51 will be proportional to the frequency of discharge of Geiger-Muller tube 19 and will control the amount of current flowing through the tube 52. Since the frequency of discharge of the Geiger-Muller tube is proportional to the intensity of incident radiation and the intensity of incident radiation is controlled by the nature of the radiation path, it is apparent that the indication of the meter 53 can be made to indicate the presence of solid in the beam path.

From the above description of my apparatus it is apparent that my method of measuring the thickness of a pipe wall rests upon a simple geometric determination of the radial distance it is necessary to move the radiation source and detector relative to the pipe wall to find two sharp changes in intensity of received radiation. It possesses the distinct advantages that:

No absolute determination of incident or transmitted radiation intensity is necessary and no precise determination of the ratio of transmitted to incident radiation intensity is necessary;

All errors caused by inaccuracies in intensity measurements are substantially eliminated and all dependence is placed upon a single geometric measurement by making the detector an indicator rather than the primary scale;

The apparatus as disclosed can be used to measure the wall thickness of curved sections of any material; no separate calibrations for different materials are required; it is not necessary that the curvature be uniform since the separation of outer and inner wall is measured by a geometric determination;

The beam of radiation need not necessarily be directed through the pipe wall in a direction perpendicular to the pipe axis since the outer and inner wall are located by movement of the beam.

Since changes may be made in the practice of the above described method and in the arrangement of apparatus therefor without departing from the scope of the invention, it is intended that all matter contained in the above description or shown in the accompanying drawings shall be interpreted as illustrative and not in a limiting sense.

The invention described herein may be manufactured and used by or for the Government of the United States of America for Governmental Having described my invention, what I claim as new and desire to secure by Letters Patent is:

1. The method of measuring the thickness of curved sections of solid material by passing radiation into the curved surface in a direction to emerge through the same surface, comprising, arranging a source of radiation and a detector so that the received radiation is a narrow beam normal to a radius of curvature of the section, moving said radiation source and detector toward the section while maintaining the beam of radiation normal to a radius, detecting the beginning of decrease in intensity of received radiation at the detector and the beginning of its increase, the amount of motion of the source and detector between sharp changes of received radiation intensity being a measure of the thickness of the section.

2. The method of measuring the thickness of a curved section of solid material by passing radiation into the curved surface in a direction to emerge through the same surface comprising, maintaining the line of radiation between a collimated beam of radiation and a detector and a radius of the section mutually orthogonal, causing relative motion between said section and said beam in the direction of said radius while maintaining said orthogonal relationship so that the amount of relative motion between said section and beam of radiation occurring between sharp changes in intensity of radiation received by the detector is a measure of the thickness of the curved section.

3. The method of measuring the thickness of a pipe wall by passing radiation into the curved surface thereof in a direction to emerge through the same surface, comprising, maintaining a mutually orthogonal relationship between a radius of said pipe and a collimated beam of penetrating radiation while moving said beam radially toward the axis of said pipe, and detecting sudden changes in the intensity of the beam incident upon a detector, said changes indicating the location of outer and inner boundaries of the pipe wall.

4. The method of measuring the thickness of a pipe wall by passing radiation into the curved surface thereof in a direction to emerge through the same surface, comprising, maintaining a mutually orthogonal relationship between a radius of said pipe and a collimated beam of penetrating radiation, while moving said pipe radially toward said beam and dectecting sharp changes in the intensity of the beam incident upon a detector said changes indicating the outer and inner boundaries of said pipe wall.

5. Apparatus for measuring pipe wall thicknesses by passing radiation into the curved surface of said pipe wall in a direction to emerge through the same surface, comprising, in combination, a source of penetrating radiation, a highly collimated beam detector therefor, means for moving said beam through said pipe wall from the outside in a direction transverse to the beam whereby to effect a slicing movement of the beam into the pipe and means for measuring the amount of motion of said beam.

6. Apparatus for measuring pipe wall thicknesses by passing radiation into the curved surface of said pipe wall in a direction to emerge through the same surface, comprising, in combination, a source of highly collimated penetrating radiation, a detector therefor, means for producing relative motion between said beam and said pipe moving the radiation beam toward the center or away from the center of the pipe, and means for measuring the amount of said motion.

7. Apparatus for measuring pipe wall thicknesses by passing radiation into the curved surface of said pipe wall in a direction to emerge through the same surface comprising, in combination, a source of collimated penetrating radiation, a Geiger-Muller tube arranged with a shield as a highly collimated beam detector therefor, a measuring circuit for measuring and indicating the quantity of radiation received by said detector, and calibrated means for moving the radiation beam toward or away from the center of the pipe.

8. Apparatus for inspecting pipe walls for uniformity of thickness by passing radiation into the curved surface thereof in a direction to emerge through the same surface comprising a source of collimated penetrating radiation, a detector therefor and means for limiting the extent to which said pipe section can be interposed in said radiation path so that the path of said beam of radiation through a pipe of given outside diameter is a chord of constant length, independently of wall thickness.

9. Apparatus for measuring the thickness of curved sections by passing radiation into the curved surface in a direction to emerge through the same surface, comprising, in combination, a source of penetrating radiation, a highly collimated beam detector therefor, means for moving said beam through said curved section from the outside toward the inner side and means for measuring the amount of motion of said beam.

HERBERT FRIEDMAN.

REFERENCES CITED

The following references are of record in the file of this patent:

UNITED STATES PATENTS

| Number | Name | Date |
| --- | --- | --- |
| 2,097,760 | Failla | Nov. 2, 1937 |
| 2,277,756 | Hare | Mar. 31, 1942 |
| 2,346,486 | Hare | Apr. 11, 1944 |
| 2,349,429 | Herzog | May 23, 1944 |
| 2,370,163 | Hare | Feb. 27, 1945 |